July 15, 1941.   J. L. GETAZ   2,249,355
SWITCH FOR ELECTRIC CURRENT
Original Filed Jan. 13, 1937
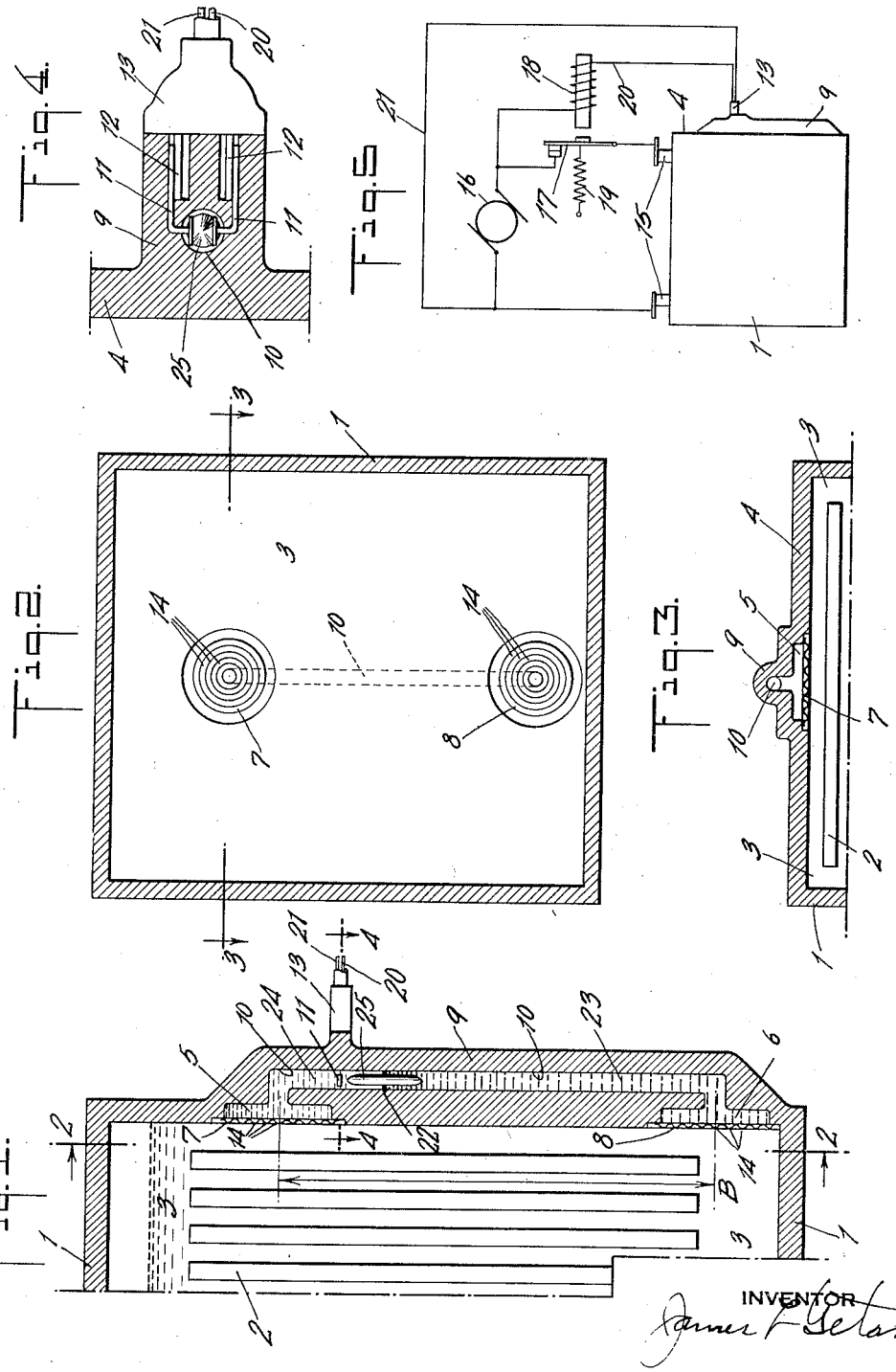
INVENTOR
James L. Getaz Patented July 15, 1941

2,249,355

UNITED STATES PATENT OFFICE 2,249,355

SWITCH FOR ELECTRIC CURRENT

James L. Getaz, Maryville, Tenn.

Original application January 13, 1937, Serial No. 120,365. Divided and this application November 16, 1938, Serial No. 240,765

5 Claims. (Cl. 200—83)

This application is a division of my co-pending application for U. S. Letters Patent, for the Regulation of storage batteries, Serial Number 120,365, filed January 13, 1937.

This invention relates to switches for electric currents, and particularly to a type of switch especially suited for the charging current of an electric storage battery.

It is the purpose of this invention to provide a switch for the charging current by which this current may be connected and disconnected automatically in accordance with the amount of the charge contained in the battery. Other purposes for which switches of this kind may be used will be apparent from the drawing and following specification.

Fig. 1 is a section through a portion of a battery which is equipped with means for controlling the charging current.

Fig. 2 is a section along line 2—2 of Fig. 1.

Fig. 3 is a section along line 3—3 of Fig. 2.

Fig. 4 is a section along line 4—4 of Fig. 1.

Fig. 5 is a diagram showing the connections for charging.

The battery as shown consists of a container 1, containing plates 2 and electrolyte 3. In a side wall 4 of the container are two openings 5 and 6. The opening 5 is in the upper portion of the side wall but low enough to be always below the surface of the electrolyte. The opening 6 is near the bottom of the battery. These openings 5 and 6 are covered respectively with thin sheets 7 and 8 and are composed of a flexible material which is not affected by the chemical action of the electrolyte. These sheets 7 and 8 are sealed into recesses in the side wall 4 so that the electrolyte cannot penetrate into the openings 5 and 6. These sheets 7 and 8 contain circular corrugations 14 which permit them to be deflected by the elasticity of the corrugation without breaking the seal between the sheets and the side wall.

Between the openings 5 and 6 there is an enlarged portion 9 of the side wall 4, containing a vertical passage or tube 10, which provides an unobstructed passage between the two openings 5 and 6. In the sides of tube 10 are electrical contacts 11 opposite each other which extend within the surface of the tube and connect with plug receptacles 12 which are on the outside of the enlarged portion 9 of the side wall. By inserting an electrical plug 13 in receptacles 12, electrical connections may be made between the contacts 11 and outside circuits.

As shown in Fig. 5 the terminals of the battery 1 are connected to the generator 16 by a circuit containing a switch 17. This switch is used to close the circuit between the generator 16 and the battery 1 and is opened by an electromagnet 18, and closed by a spring 19. The electromagnet 18 is connected by the wires 20 and 21 to the terminals of the generator 16 and in series with the terminals of the plug 13. By this means, if the circuit of the wires 20 and 21 is closed by connecting the contacts 11 in tube 10 the electromagnet 18 is energized opening the switch 17, and disconnecting the generator 16 from the battery. If this circuit is broken by disconnecting the contacts 11, the electromagnet 18 is demagnetized, the switch 17 is closed by the spring 19, the circuit between the generator and the battery is closed and the battery is charged by the generator.

The amount of electricity in the charge of the battery varies directly with the specific gravity of the electrolyte, and it is a purpose of the means shown in this invention to close the electrical circuit through the contacts 11 when the specific gravity of the electrolyte rises to a given maximum value, and to open this circuit when this specific gravity falls below a certain minimum value. To accomplish such a purpose the tube 10 and the opening 6 are filled up to a certain height in the tube with a liquid 23 which has a specific gravity greater than the maximum specific gravity which it is desired to have in the electrolyte. This heavier liquid may be an aqueous solution of some suitable salt and is shown in Fig. 1 as filling the tube 10 up to the level 22. The remaining portion of the tube 10 above the level 22 and the opening 5 are filled with a liquid 24 which has a lower specific gravity, and which will not mix with the liquid 23. This lighter liquid may be a suitable oil. These two liquids fill the entire space between the flexible sheets 7 and 8. The height of the surface 22 between the two liquids 23 and 24 will be determined by the relative pressure on the sheets 7 and 8. Both of these sheets being flexible, if the difference in pressure applied by the electrolyte on sheets 7 and 8 increases, sheet 8 will be pressed toward the outside of the battery, and will raise the level 22. As level 22 is raised the additional space at the top of the tube required for liquid 24 will be provided by sheet 7 being deflected toward the inside of the battery. As the area of the openings 5 and 6 is large compared with the cross section of the tube 10, a small deflection of the sheets 7 and 8 will cause a correspondingly large movement of the level 22. As for example if the diameter of the tube is 5 millimeters, and the diameter of the openings 5 and 6 is 3 centimeters, an average deflection of three tenths of a millimeter in sheets 7 and 8 would produce a change in the height of the surface 22 of 1 centimeter.

Inserted in the tube 10 is a hollow metallic bulb 25 which has a specific gravity, which is between the specific gravities of the two liquids 23 and 24. This bulb 25 floats on the surface 22, being partly immersed in liquid 23, and its upper portion extending into liquid 24. As shown in Fig. 1, the upper extremity of this bulb 25 is below the electrical contacts 11 and with the bulb in this position the circuit of the wires 20 and 21 is open, as the liquid 24 is an oil which is a non-conductor of electricity, the switch 17 is closed and the battery is connected to the generator to be charged. As the charge in the battery is increased, the specific gravity of the electrolyte becomes greater, which increases the difference in pressure between the points A and B. Under this increased pressure the disc 8 is deflected toward the outer wall of the battery, and the surface 22 is raised until the bulb 25, which is floating on this surface, comes in contact with the electrical connections 11.

When the bulb 25 touches these contacts 11, the circuit of the wires 20 and 21 is completed through the bulb, the electromagnet 18 is energized, the switch 17 is opened and the charging is discontinued. As the charge of the battery is used, the difference in pressure between the points A and B decreases, this causes the level 22 to become lower with a corresponding lower position of the bulb 25. As the bulb becomes lower, it does not touch the contacts 11, the circuit of the wires 20 and 21 is broken and the battery is connected to the generator by the closing of switch 17, so that it may be recharged.

If it is desired to hold the specific gravity of the electrolyte between 1.20 and 1.22, and the vertical distance A—B from the center of opening 5 to the center of opening 6 is 8 centimeters, then the average difference between the pressure on sheet 7 and the pressure on sheet 8, exerted by the electrolyte, would be .16 gram per centimeter. If we use for liquid 23 a salt solution having a specific gravity of 1.28 and for liquid 24 a heavy oil having a specific gravity of .95, then for a minimum specific gravity of the electrolyte we would have the height of the surface 22 above the level B of approximately 6 centimeters.

$$6 \times 1.28 \quad 2 \times 9.5 = 8 \times 1.20$$

When the specific gravity of the electrolyte is increased to 1.22 the height of the surface 22 above the level 13 would be approximately 6.55 centimeters $$6.55 \times 1.28 \quad 1.45 \times 95 = 8 \times 1.22$$

This would give a vertical travel of the surface 22 of .55 of a centimeter for variation, a specific gravity of electrolyte from 1.20 to 1.22. This is more than sufficient travel to open and close the circuit by bringing the float 25 below and up to the contacts 11, so that a variation of .02 may be maintained between the maximum and minimum values of the specific gravity of the electrolyte. For taller batteries where the distance A—B may be more than 8 centimeters, a very close regulation may be obtained. The height of the level 22 is not affected by variations in the height of the surface of the electrolyte, as the opening 5 is below this surface. The height of the level 22 varies only with the difference in pressure between the points A and B and this difference corresponds with variations in the gravity of the electrolyte.

As shown in Fig. 1, the volume of liquid 23 is greater than the volume of liquid 24. With a rise in temperature the cubical expansion of liquid 23 is greater on account of the increased volume, and this causes the level 22 to be higher at a given density of the electrolyte. In this manner at higher temperatures the charging current will be disconnected at a less charge of the battery and the charge will be automatically regulated as to temperature. The desired amount of variation in charge for a given range in temperature may be obtained, by designing the volume of the spaces containing the liquids 23 and 24, so as to obtain the necessary difference in cubical expansion in the given range of temperature.

I claim:

1. A device for opening and closing an electrical circuit which comprises, a container, electrical contacts within said container and connected to said circuit, flexible portions at different elevations in the wall of said container, means for connecting and disconnecting said contacts according to differences of pressure applied to said portions at said elevations.

2. A device for opening and closing an electrical circuit, which comprises, a container, flexible portions in the walls of said container, a fluid of heavy specific gravity in said container and in contact with one of said flexible portions, a fluid of lighter specific gravity in said container and in contact with another of said flexible portions, electrical contacts in said container and connected to said circuit, means for connecting and disconnecting said contacts by transmitting variations of pressure on said fluids through said flexible portions.

3. A means for registering the changes in the specific gravity of a liquid which comprises, a closed container having two flexible portions in its walls which are immersed in said liquid at different elevations, means for controlling an electric current by variations in the pressure of said liquid on said flexible portions.

4. A means for registering the changes in the specific gravity of a liquid which comprises, a container having two flexible portions in its walls and which contains two fluids of different specific gravities, means for registering variations in the height of the line of separation between said fluids.

5. A means for registering the changes in the specific gravity of a liquid which comprises, a container having two flexible portions in its walls, which are immersed in said liquid at higher and lower elevations, means for opening and closing an electric circuit according to changes in the difference of pressure of said liquid at said elevations.

JAMES L. GETAZ.